(12) United States Patent
Gupta et al.

(10) Patent No.: US 12,093,394 B2
(45) Date of Patent: Sep. 17, 2024

(54) SYSTEM AND METHOD FOR SECURE DECONSTRUCTION SENSOR IN A HETEROGENEOUS INTEGRATION CIRCUITRY

(71) Applicant: XILINX, INC., San Jose, CA (US)

(72) Inventors: Aman Gupta, Sunnyvale, CA (US); James D. Wesselkamper, Albuquerque, NM (US); James Anderson, Madison, AL (US); Nader Sharifi, San Jose, CA (US); Ahmad R. Ansari, San Jose, CA (US); Sagheer Ahmad, Cupertino, CA (US); Brian C. Gaide, Erie, CO (US)

(73) Assignee: XILINX, INC., San Jose, CA (US)

( * ) Notice: Subject to any disclaimer, the term of this patent is extended or adjusted under 35 U.S.C. 154(b) by 41 days.

(21) Appl. No.: 18/111,808

(22) Filed: Feb. 20, 2023

(65) Prior Publication Data

US 2024/0281537 A1   Aug. 22, 2024

(51) Int. Cl.
| | |
|---|---|
| *G06F 21/57* | (2013.01) |
| *H04L 9/06* | (2006.01) |
| *H04L 9/08* | (2006.01) |
| *H04L 9/14* | (2006.01) |
| *H04L 9/30* | (2006.01) |

(52) U.S. Cl.
CPC .......... *G06F 21/575* (2013.01); *H04L 9/0618* (2013.01); *H04L 9/0822* (2013.01); *H04L 9/0861* (2013.01); *H04L 9/14* (2013.01); *H04L 9/30* (2013.01); *G06F 2221/034* (2013.01)

(58) Field of Classification Search
CPC .... G06F 21/575; H04L 9/0618; H04L 9/0822
See application file for complete search history.

(56) References Cited

U.S. PATENT DOCUMENTS

| | | | |
|---|---|---|---|
| 8,981,810 B1 | 3/2015 | Trimberger et al. |
| 9,082,514 B1 | 7/2015 | Trimberger |
| 9,225,512 B1 | 12/2015 | Trimberger |
| 9,444,618 B1 | 9/2016 | Trimberger et al. |

(Continued)

OTHER PUBLICATIONS

Wang, C., et al., "TSV-based PUF circuit for 3DIC sensor nodes in IoT applications," 2015 IEEE International Conference on Electron Devices and Solid-State Circuits (EDSSC), Singapore, 2015, pp. 313-316.

(Continued)

*Primary Examiner* — Phil K Nguyen
(74) *Attorney, Agent, or Firm* — Patterson + Sheridan, LLP

(57) ABSTRACT

Some examples described herein provide for securely booting a heterogeneous integration circuitry apparatus. In an example, an apparatus (e.g., heterogeneous integration circuitry) includes a first portion and a second portion of one or more entropy sources on a first component and a second component, respectively. The apparatus also includes a key generation circuit communicatively coupled with the first portion and the second portion to generate a key encrypted key based on a first set of bits output by the first portion and a second set of bits output by the second portion. The apparatus also includes a key security circuit to generate, based on the key encrypted key and an encrypted public key stored at the apparatus, a plaintext public key to be used by a boot loader during a secure booting operation for the apparatus.

20 Claims, 7 Drawing Sheets

(56) References Cited

U.S. PATENT DOCUMENTS

| | | | |
|---|---|---|---|
| 9,584,329 | B1 | 2/2017 | Trimberger |
| 9,608,827 | B1 | 3/2017 | Trimberger |
| 10,027,492 | B1 | 7/2018 | Wesselkamper |
| 10,325,646 | B1 | 6/2019 | Trimberger |
| 2010/0217964 | A1* | 8/2010 | Peterka ............ G01R 31/31719 713/185 |
| 2014/0359296 | A1* | 12/2014 | Alrabady .............. H04L 9/3263 713/176 |
| 2015/0113278 | A1* | 4/2015 | Cocchi ................ H04L 63/0853 713/171 |
| 2018/0145988 | A1* | 5/2018 | Carson .................. H04L 9/0861 |
| 2021/0406381 | A1* | 12/2021 | Heisrath .............. H04L 63/108 |
| 2022/0191046 | A1* | 6/2022 | Srivastava ............ H04L 9/3247 |
| 2022/0209946 | A1* | 6/2022 | Simon ................... H04W 12/04 |
| 2023/0244822 | A1* | 8/2023 | Li .......................... G11C 29/42 713/193 |
| 2023/0351055 | A1* | 11/2023 | Lai ........................ G06F 21/575 |

OTHER PUBLICATIONS

U.S. Appl. No. 18/084,974 Entitled "Registration of a PUF Signature and Regeneration Using a Trellis Decoder".

* cited by examiner

SYSTEM AND METHOD FOR SECURE DECONSTRUCTION SENSOR IN A HETEROGENEOUS INTEGRATION CIRCUITRY

TECHNICAL FIELD

Examples of the present disclosure generally relate to securely booting a heterogeneous integration circuitry apparatus, for example to sense deconstruction of the apparatus.

BACKGROUND

Electronic devices, such as are included in tablets, computers, copiers, digital cameras, smart phones, control systems, and automated teller machines, among others, often include integrated circuit die(s) for some desired functionality. A heterogeneous integration circuitry is a type of microelectronics device that integrates multiple different materials, components, and technologies into a single compact package. This type of device aims to provide a high level of functionality and performance while also reducing the overall size, cost, and complexity of the system. Heterogeneous integration module (HIM) devices are commonly used in a wide range of applications, including smartphones, wearable devices, and internet of things (IoT) devices, as well as in various fields such as telecommunications, computing, and robotics. They are designed to overcome the limitations of traditional microelectronics devices, which often rely on a single technology or material, by bringing together complementary components and technologies in a single, integrated package. Some examples of heterogeneous integration circuitry devices include multi-layer microelectronics packages, system-in-package (SiP) devices, and 2D and 3D integrated circuits (3D ICs). These devices can offer improved performance, higher functional density, and better thermal management compared to traditional microelectronics devices.

One security weakness of a heterogeneous integration circuitry device is that the heterogeneous integration circuitry may be vulnerable to a deconstruction attack. A deconstruction attack is a tool or method used to physically separate and remove individual components or layers from the heterogeneous integration circuitry, including separating individual components (e.g., ICs of the heterogeneous integration circuitry). This may be done as part of the reverse engineering process or by a malicious hacker, where engineers want to examine the internal structures and circuits of a heterogeneous integration circuitry in order to understand its design and functionality, or to gain access to sensitive or propriety information or systems of the heterogeneous integration circuitry. The deconstruction process can be done using various techniques, including mechanical separation, chemical etching, and laser ablation, among others. The deconstruction process may be used by hackers. There are several different types of deconstruction attach techniques, including physical and chemical methods. Physical methods involve physically cutting or breaking open the heterogeneous integration circuitry to expose its internal structure and components, while chemical methods use chemical reactions to dissolve or etch away layers of the heterogeneous integration circuitry, or its components, to reveal the underlying structures.

Using deconstruction, the attacker may be able to gain access to sensitive information and processes of components of the heterogeneous integration circuitry. For example, an attacker may deconstruct the heterogeneous integration circuitry to separate components of the heterogeneous integration circuitry, and obtain one or more of individual components. The attacker may then execute a component (e.g., a primary or secondary chip) in a non-secure environment and extract intellectual property, keys, or information of security importance. As such, techniques to prevent deconstruction attacks are desired.

SUMMARY

Some examples described herein provide for securely booting a heterogeneous integration circuitry apparatus. In an example, an apparatus (e.g., a heterogeneous integration circuitry) includes a first portion and a second portion of one or more entropy sources on a first component and a second component, respectively. The apparatus also includes a key generation circuit communicatively coupled with the first portion and the second portion to generate a key encrypted key based on a first set of bits output by the first portion and a second set of bits output by the second portion. The apparatus also includes a key security circuit to generate, based on the key encrypted key and an encrypted public key stored at the apparatus, a plaintext public key to be used by a boot loader during a secure booting operation for the apparatus.

An example of the present disclosure is an apparatus. The apparatus includes a first portion of one or more entropy sources on a first component of a heterogeneous integration circuitry. The apparatus also includes a second portion of the one or more entropy sources on a second component of the heterogeneous integration circuitry. The apparatus also includes a key generation circuit communicatively coupled with the first portion of the one or more entropy sources on the first component and the second portion of the one or more entropy sources on the second component to generate a key encrypted key based at least in part on a first set of bits output by the first portion of the one or more entropy sources and a second set of bits output by the second portion of the one or more entropy sources. The apparatus also includes a key security circuit to generate, based at least in part on the key encrypted key and an encrypted public key stored at the apparatus, a plaintext public key to be used by a boot loader during a secure booting operation for the apparatus.

An example of the present disclosure is a method of securely booting a heterogeneous integration circuitry apparatus. The method includes generating a key encrypted key based at least in part on a first set of bits and a second set of bits, where the first set of bits is output by a first portion of one or more entropy sources on a first component of a heterogeneous integration circuitry, and the second set of bits is output by a second portion of one or more entropy sources on a second component of the heterogeneous integration circuitry. The method also includes obtaining an encrypted public key from a memory device of the heterogeneous integration circuitry. The method also includes decrypting the encrypted public key using the key encrypted key to generate a plaintext public key. The method also includes performing a secure booting operation for the apparatus using the plaintext public key.

Another example of the present disclosure is a method of securely booting a heterogeneous integration circuitry apparatus. The method includes generating a key encrypted key based at least in part on a first set of bits and a second set of bits, where the first set of bits is output by a first portion of one or more entropy sources on a first component of a heterogeneous integration circuitry, and the second set of bits is output by a second portion of one or more entropy sources on a second component of the heterogeneous integration circuitry. The method also includes obtaining a plaintext public key via a public key interface. The method also includes generating, during an enrollment operation, an encrypted public key as a function of the plaintext public key and the key encrypted key. The method also includes storing the encrypted public key in a memory device of the heterogeneous integration circuitry.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
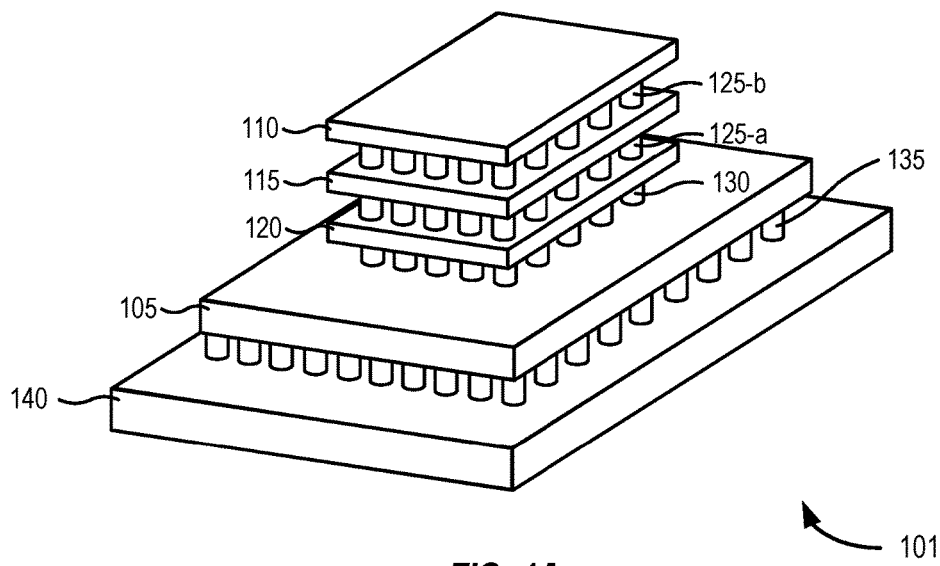
FIG. 1A illustrates an isometric view of a heterogeneous integration circuitry comprising an apparatus to securely boot a heterogeneous integration circuitry according to some examples.

Some examples described herein provide for securely booting a heterogeneous integration circuitry apparatus. Heterogeneous integration circuitry may also be referred to as a heterogeneous integration module (HIM) in some examples). A system and method are proposed for a deconstruction sensor for a multiple component heterogeneous integration circuitry structure (e.g., a 2.5D or 3D multichip setup). One or more embodiments include an architecture using dedicated hardware blocks and Read Only Memory (ROM) code to detect if a heterogeneous integration circuitry (e.g., multi-chip) setup has been deconstructed by an adversary (hacker, attacker) to execute a component (e.g., primary or secondary chip) in a non-secure environment to gain access to the information, operation, and systems of the heterogeneous integration circuitry. The benefits of the embodiments described herein include one or more of greater resource efficiency while abiding by industry standard requirements for a deconstruction sensor.

In one or more embodiments, the heterogeneous integration circuitry may be a secure device that supports a way to boot the device securely. A Hardware Root of Trust in such devices is used to execute a secure BootROM sequence which checks predefined security functions, their desired state before booting the device and loading of Secondary Stage boot loader. The Root of Trust is a public key, such as a customer's public key that is stored on the device. In a secure boot mode, the heterogeneous integration circuitry device authenticates the boot loader. Once the boot loader has been loaded securely, control of the heterogeneous integration circuitry is handed off to the customer. Customer public key, along with other Keys stored in the device, can be encrypted using a key encrypted key (KEK) to protect against physical attacks (e.g., eFuse attack of being able to read stored content under X-ray). A KEK is generated per component (e.g., per silicon) using a physically unclonable function (PUF) mechanism.

During a device enrollment operation, a public key is obtained (e.g., a customer public key is supplied), and a PUF mechanism is used to encrypt the public key, which is then stored in memory. Subsequently, during a secure booting operation for the heterogeneous integration circuitry, the PUF is used to decrypt the stored encrypted public key to be used by the boot loader (e.g., BootROM) for the booting procedure.

With Moore's law hitting physics limitation, engineers are facing challenges in further reducing the device sizes. To get around this challenge and increase performance, the semiconductor industry is going in the direction of heterogeneous integration circuitry, including 2.5D (Chiplets) and/or 3D stacked devices. Such devices place a lot of security challenges. Device deconstruction and access of one component of the heterogeneous integration circuitry (stack, die) by an attacker is one such challenge. In a deconstruction attack, the adversary will de-lid the heterogeneous integration circuitry, or part including a heterogeneous integration circuitry, and remove one or more components (or stacks, chips) from a heterogeneous integration circuitry (e.g., for a 3D device). After de-lidding, the adversary will try to probe the components of interest to gather or extract intellectual property (IP), keys, information of security importance, or execute the device insecurely. Such de-lidding or deconstruction can also be used to access 2.5D devices, for example where interposer interfaces are exposed after deconstruction.

One mitigation to protect the heterogeneous integration circuitry (e.g., 2.5D or 3D stacked devices) from attacks (e.g., deconstruction attacks) is to design a system to ensure that the device does not boot if a component of the heterogeneous integration circuitry is de-lidded or deconstructed.

In one or more embodiments, an architecture for a heterogeneous integration circuitry is used where dedicated circuitry (e.g., hardware blocks, read only memory (ROM) code) are used to detect if a heterogeneous integration circuitry (e.g., multi-chip setup) has been deconstructed by an adversary (attacker, hacker) to execute a primary or secondary chip in a non-secure environment. As part of securely booting the heterogeneous integration circuitry, the circuitry of the heterogeneous integration circuitry generates a KEK based on a first set of bits and a second set of bits. The first set of bits is output by a first portion of one or more entropy sources (e.g., a first set of ring oscillators, which may be organized as a set of ring oscillator banks) on a first component (e.g., chip, die) of the heterogeneous integration circuitry. The second set of bits is output by a second portion of one or more entropy sources (e.g., a second set of ring oscillators, which may be organized as a set of ring oscillator banks) on a second component (e.g., chip, die) of the heterogeneous integration circuitry. An encrypted public key may be obtained from a memory device of the heterogeneous integration circuitry, and the KEK used to decrypt the encrypted public key obtained from memory. The decryption process may generate a plaintext public key, which may then be used to perform a secure booting operation for the heterogeneous integration circuitry. According to some aspects, because the KEK uses bits derived from entropy sources on multiple components of the heterogeneous integration circuitry, if the components are deconstructed, the KEK will not be properly generated, and the boot operation fail due to an incorrectly decrypted public key used for the booting of the heterogeneous integration circuitry.

In one or more embodiments, during enrollment, a plaintext public key (e.g., obtained from a customer, a customer public key) is obtained via a public key interface of the heterogeneous integration circuitry. A KEK is generated as described herein from the one or more entropy sources on different components of the heterogeneous integration circuitry, and the KEK is used to generate an encrypted public key from the obtained public key (e.g., encrypting as a function of the KEK and public key). The encrypted public key is then stored in a memory device of the heterogeneous integration circuitry for use during the booting procedure.

The benefits of this invention include greater resource efficiency while abiding by industry standard requirements for a deconstruction sensor.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1A illustrates an isometric view of a heterogeneous integration circuitry 101 comprising an apparatus to securely boot a heterogeneous integration circuitry. The heterogeneous integration circuitry 101 includes a first component 110, a second component 120, and a third component 115.

The heterogeneous integration circuitry 101 includes a wiring substrate 105. In one or more embodiments, the wiring substrate 105 may be or be referred to as an interposer. The first component 110 is attached to a first side of the wiring substrate 105 by connectors 130 (e.g., external connectors), a first side of the third component 115 is attached to a second side of the first components 110 by connectors 125-a (e.g., inter-component connectors), and a first side of the second component 120 is attached to a second side of the third component 115 by connectors 125-b (e.g., inter-component connectors). The connectors 125-a, 125-b, and 130 can be, for example, microbumps or the like, and can form an electrical connection and physical attachment between the third component 115 and the first component 110, between the second component 120 and the third component 115, and between the first component 110 and the wiring substrate 105, respectively. In one or more embodiments, a second side of the wiring substrate 105 (opposite from the first side of the wiring substrate 105) is attached to a first side of a package substrate 140 by external connectors 135. The external connectors 135 can be, for example, controlled collapse chip connections (C4) or the like, and can form an electrical connection and physical attachment between the wiring substrate 105 and the package substrate 140. External connectors (not shown) are attached to a second side of the package substrate (opposite from the first side of the package substrate). The external connectors can be, for example, ball grid array (BGA) balls or the like, and may be used to attach the package substrate 140 to a printed circuit board (PCB) (not shown).

In one or more embodiments, the first component 110 may be referred to as a base component, the third component 115 may be referred to as a middle component, and the second component 120 may be referred to as a top component. Although one middle component (e.g., third component 115) is illustrated, consistent with the disclosure herein, zero or more middle components may be present in heterogeneous integration circuitry 101. In one or more embodiments, third component 115 may be absent, such that the first component 110 is directly communicatively coupled with the second component 120 with external conductors, but without an intervening component.

Figure 1B:
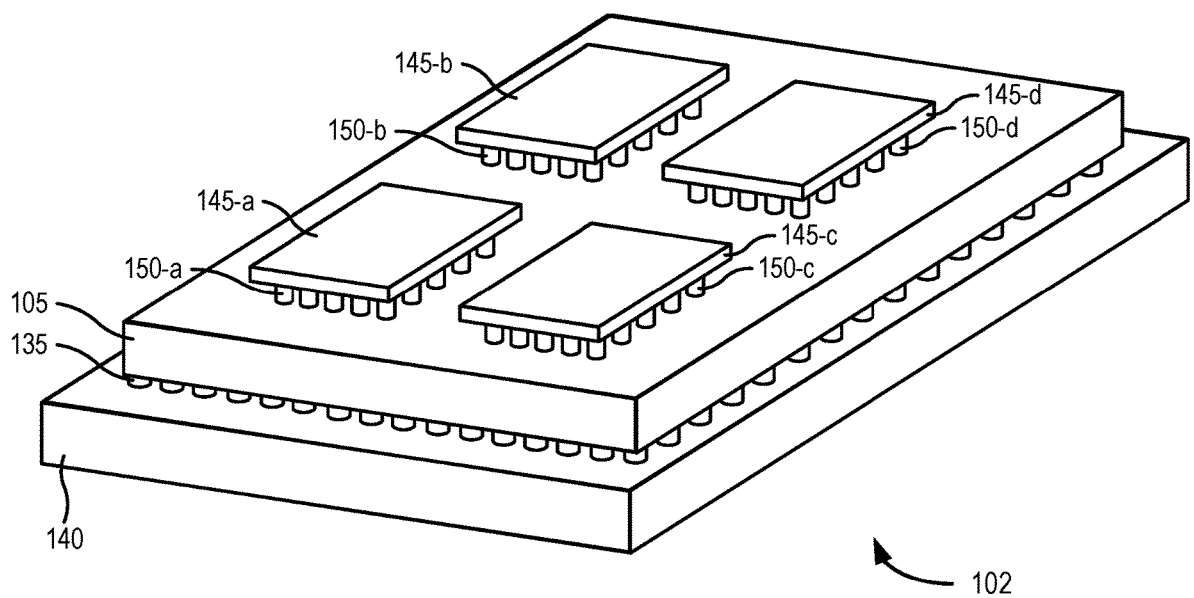
FIG. 1B illustrates an isometric view of a heterogeneous integration circuitry comprising an apparatus to securely boot a heterogeneous integration circuitry according to some examples.

FIG. 1B illustrates an isometric view of a heterogeneous integration circuitry 102 comprising an apparatus to securely boot a heterogeneous integration circuitry. The heterogeneous integration circuitry 102 includes a set of components 145, including a first component 145-a, a second component 145-b, a third component 145-c, and a fourth component 145-d.

The heterogeneous integration circuitry 101 includes a wiring substrate 105. In one or more embodiments, the wiring substrate 105 may be or be referred to as an interposer. Each of the components 145 are attached to a first side of the wiring substrate 105 by connectors 150 (e.g., external connectors). The first component 145-a is attached to the first side of the wiring substrate 105 by connectors 150-a. The second component 145-b is attached to the first side of the wiring substrate 105 by connectors 150-b. The third component 145-c is attached to the first side of the wiring substrate 105 by connectors 150-c. The fourth component 145-d is attached to the first side of the wiring substrate 105 by connectors 150-d. The connectors 150 can be, for example, microbumps or the like, and can form an electrical connection and physical attachment between each of the components 145 and the wiring substrate 105. In one or more embodiments, a second side of the wiring substrate 105 (opposite from the first side of the wiring substrate 105) is attached to a first side of a package substrate 140 by external connectors 135. The external connectors 135 can be, for example, controlled collapse chip connections (C4) or the like, and can form an electrical connection and physical attachment between the wiring substrate 105 and the package substrate 140. External connectors (not shown) are attached to a second side of the package substrate (opposite from the first side of the package substrate). The external connectors can be, for example, ball grid array (BGA) balls or the like, and may be used to attach the package substrate 140 to a printed circuit board (PCB) (not shown).

Although four components 145 are illustrated, consistent with the disclosure herein, a different quantity of components 145 may be attached to wiring substrate 105. In one or more embodiments, two components 145 are attached to wiring substrate 105 in heterogeneous integration circuitry 101. In one or more embodiments, three components 145 are attached to wiring substrate 105 in heterogeneous integration circuitry 101. In one or more embodiments, five or more components 145 are attached to wiring substrate 105 in heterogeneous integration circuitry 101.

In one or more embodiments, different components can be or include different types of components. For example, one or more of the first component 110 or component 145 (e.g., first component 145-a) can be or include an active optical and/or photonic device (e.g., for generating an optical signal for a fiber optic port), and one or more of the second component 120, third component 115, or component 145 (e.g., second component 145-b) can be or include an electrical device (e.g., a die comprising a processor, a programmable logic IC, an ASIC, the like, or a combination thereof).

The arrangements of first component 110, second component 120, third component 115, first component 145-a, second component 145-b, third component 145-c, fourth component 145-d, wiring substrate 105 (e.g., an interposer), and package substrate 140 is for illustration purposes. The heterogeneous integration circuitry can have different configurations with more or fewer components. For example, the second component 120 and component 145 can be attached to the package substrate 140 by external connectors without an interposer intervening therebetween. In other examples, the first component 110, second component 120, and third component 115 can be integrated in an integrated fan-out package. The first component 110, second component 120, and third component 115 are electrically and/or communicatively coupled together directly and/or via the wiring substrate 105 (e.g., an interposer) in the illustrated example of heterogeneous integration circuitry 101, or via an interposer, package substrate, and/or metallization of an integrated fan-out package. Generically, the first component 110, second component 120, and third component 115 are electrically and/or communicatively coupled together via a wiring substrate. The first component 145-a, second component 145-b, third component 145-c, fourth component 145-d are electrically and/or communicatively coupled together via the wiring substrate 105 (e.g., an interposer) in the illustrated example of heterogeneous integration circuitry 102, or via an interposer, package substrate, and/or metallization of an integrated fan-out package. Generically, the first component 145-a, second component 145-b, third component 145-c, fourth component 145-d are electrically and/or communicatively coupled together via a wiring substrate.

In one or more embodiments, connectors 125, connectors 150, or both, are through-silicon vias (TSVs). TSVs allow efficient vertical communication across multiple stacks which helps chip-design to overcome challenge with limitations of Moore's law. TSVs provide connectivity with low-power signature, smaller form-factor, higher performance, and function density.

Figure 2:
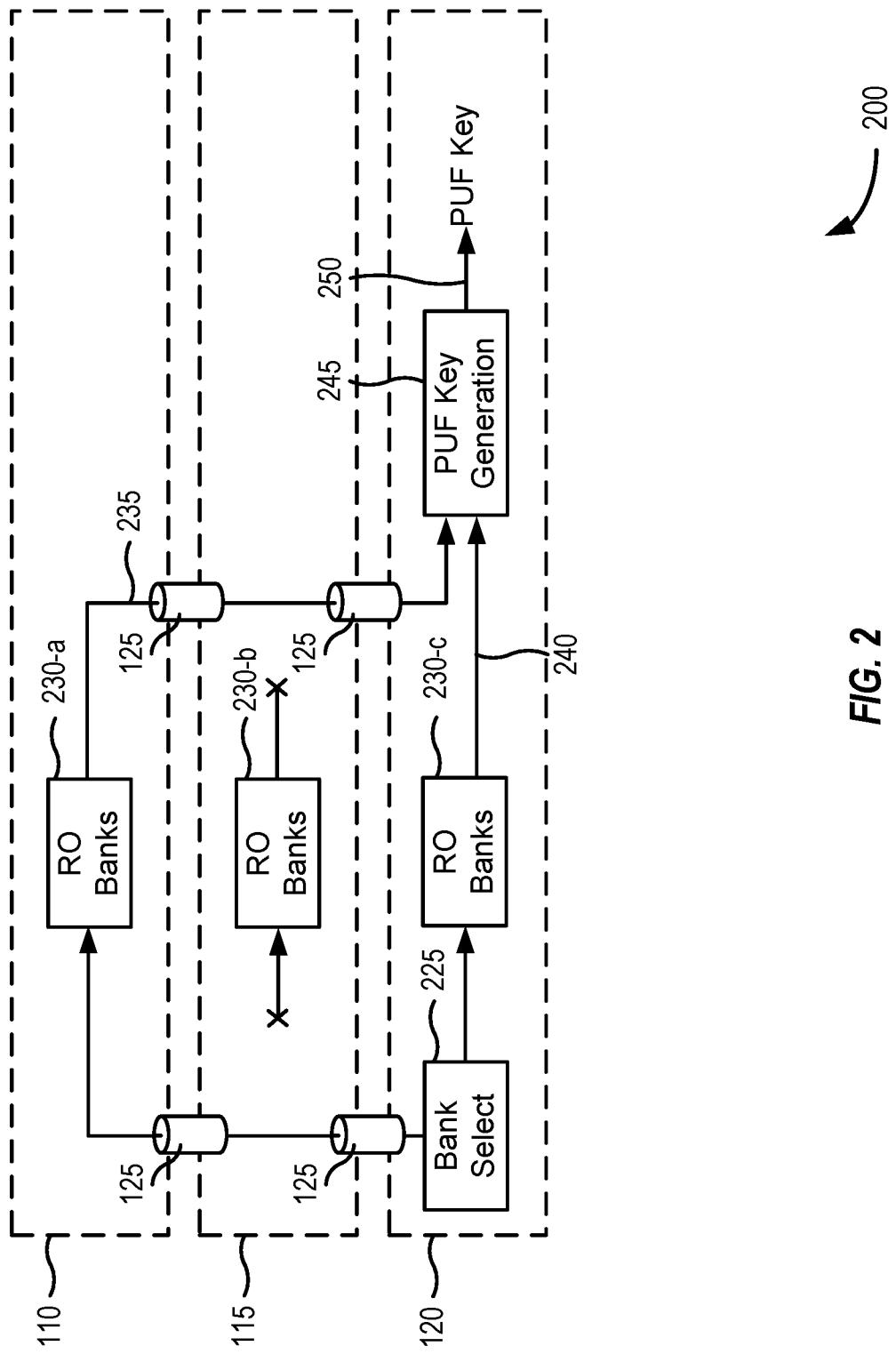
FIG. 2 illustrates a simplified cross-sectional view of a heterogeneous integration circuitry to securely boot a heterogeneous integration circuitry according to some examples.

FIG. 2 illustrates a simplified cross-sectional view of a heterogeneous integration circuitry 200 to securely boot a heterogeneous integration circuitry. The heterogeneous integration circuitry 101 includes a first component 110, a second component 120, and a third component 115. The first component 110, a second component 120, and a third component 115 can be connected using connectors 125 as further described with reference to heterogeneous integration circuitry 101. In one or more embodiments, first component 110 is a top die, a second component 120 is a base die, and a third component 115 is a middle die.

In one or more embodiments, multiple banks of ring oscillators (ROs) (RO banks) are arranged in 3D, and this setup is used as an entropy source for a PUF implementation. The PUF output is then coupled with the root of trust KEK used to decrypt the customer public key. The device will continue to boot only if the extracted KEK is correct and if the heterogeneous integration circuitry (e.g., 2.5D or 3D) device is not deconstructed.

PUF output is a random identifier used to uniquely identify each device (e.g., heterogeneous integration circuitry 100). Due to the property of a PUF subsystem, each device that uses PUF can generate the same identifier every time a particular device is powered ON (e.g., during a booting operating for the device). This identifier is consistent across power cycles and is unique to a particular device. Architectural considerations can allow devices to keep the PUF identifier secret, and use PUF identifier in sequences which desire or require device uniqueness.

In one or more embodiment, bank select circuit 225 and key generation circuit 245 are on second component 120 (e.g., a base die of a heterogeneous integration circuitry). In other embodiments, bank select circuit 225 and key generation circuit 245 are on a same component of first component 110, third component 115, or second component 120.

Bank select circuit 225 implements PUF RO select logic, key generation logic, and entropy improvement ASIC logic. In one or more embodiments, bank select circuit 225 is placed in the primary component (e.g., die) that is responsible for device bring up, for example the component that runs the BootROM code and enables communication across components (e.g., across dice). The primary component identifies if the current device (e.g., heterogeneous integration circuitry) contains multiple components (e.g., dice) and how many components are stacked apart from the primary component. This drives the bank select for the RO bank select.

heterogeneous integration circuitry 200 includes a set of one or more entropy sources. In one or more embodiments, multiple RO banks are placed across all components of the heterogeneous integration circuitry. A first portion of the one or more entropy sources is a RO bank on the first component 110, the RO banks 230-a. The second portion of the one or more entropy sources is an RO bank 230-b on the third component 115. The third portion of the one or more entropy sources is an RO bank 230-c on the second component 120.

In one or more embodiments, the bank select circuit 225 identifies the top component during a device bootup operation. This information can be stored in a memory device (e.g., an eFuse). In other embodiments, the identity of the top component comes through input/output (IO) pins (e.g., dedicated IO pins). With this information, bank select circuit 225 then selects (enables) the RO bank arrangement of the first component 110 (e.g., a top component). Because at least the top component will be deconstructed during a deconstruction attack, selecting the top component and using the RO bank from the top component, along with the RO bank from the second component 120 (e.g., a base component), ensures sensing the deconstruction attack of an adversary.

The RO banks 230-c of the first (base) component output a set of bits 240, which are communicatively coupled to the key generation circuit 245. The RO banks 230-a of the second (top) component output a set of bits 235, which are communicatively coupled to the key generation circuit 245 via connectors 125. The key generation circuit 245 (e.g., a 3D PUF key generation circuit) generates a PUF key 250 as a function of the first set of bits and the second set of bits.

Figure 3:
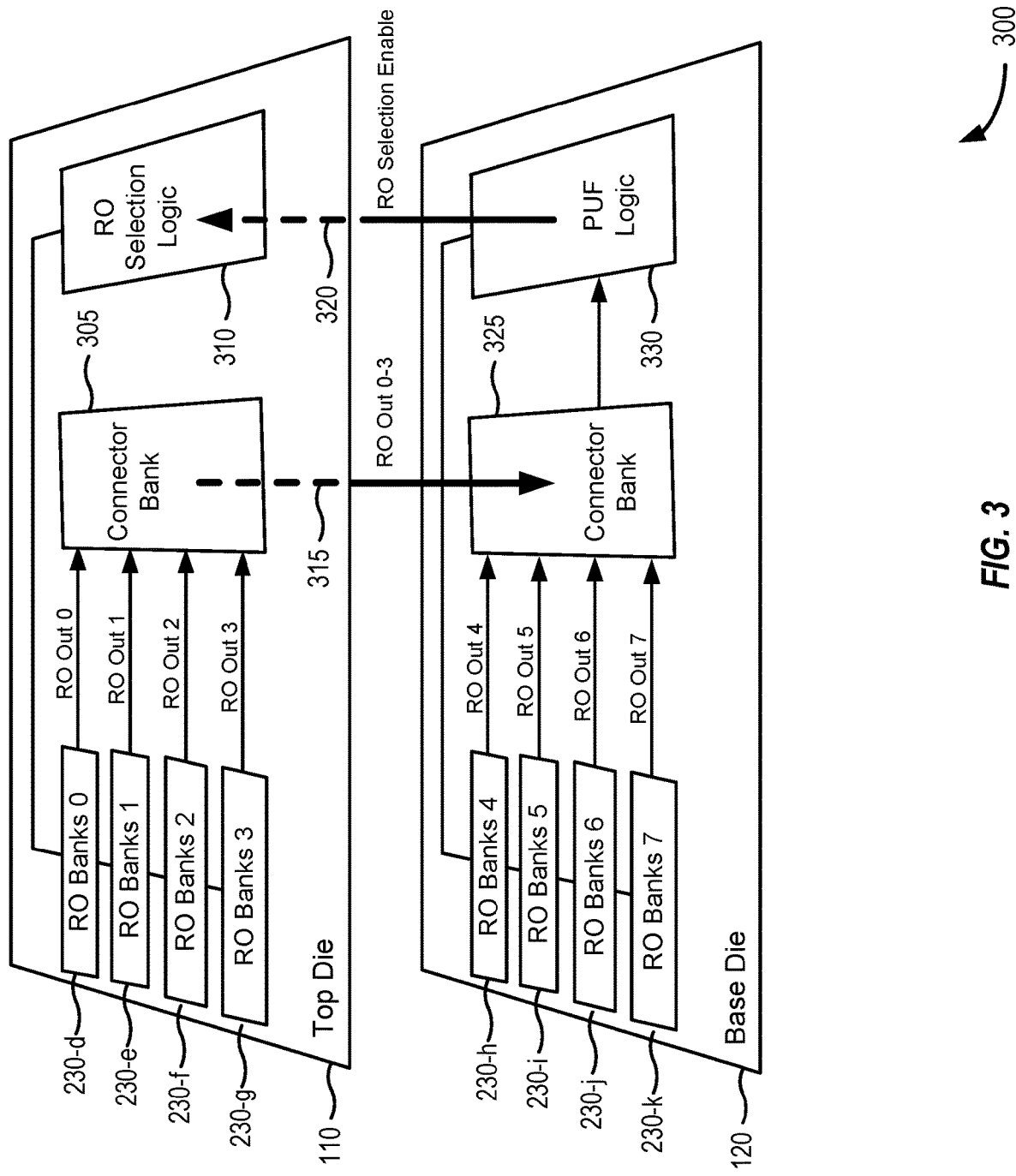
FIG. 3 illustrates a detailed isometric view of an example of an entropy source to securely boot a heterogeneous integration circuitry according to some examples.

FIG. 3 illustrates a detailed isometric view of an example of an entropy source 300 to securely boot a heterogeneous integration circuitry. Entropy source 300 includes RO banks 230, where RO banks 230-*d*, 230-*e*, 230-*f*, and 230-*g* are located on the second component 120 (e.g., a top die), and RO banks 230-*h*, 230-*i*, 230-*j*, and 230-*k* are located on the first component 110 (e.g., a base die).

Each RO bank 230 includes a set of ring oscillators (e.g., 24, 48, 60, 80, 100, 120, 128, 200, or 256 ring oscillators), the outputs of which are used to generate a PUF key. For example, RO selection logic 310 may select RO banks 230 to be used to generate the PUF key (which may also be referred to as a key generation key herein), including with input (e.g., RO selection enable signals) from the PUF logic 330 received via connectors 320. Each RO bank 230 may output a quantity of bits (e.g., 2, 4, 6, 8, or 12 bits) that are coupled with a connector bank. The output of each of RO banks 230-*d*, 230-*e*, 230-*f*, and 230-*g* are coupled with connector bank 305 of the second component 120, and thus communicatively coupled with the PUF logic 330 (e.g., at least a portion of a key security circuit) via connectors 315 (which may be an example of connectors 125) and connector bank 325 of the first component 110. The output of each of RO banks 230-*h*, 230-*i*, 230-*j*, and 230-*k* are coupled with connector bank 325 of the first component 110, and thus communicatively coupled with the PUF logic 330 (e.g., at least a portion of the key security circuit). PUF logic 330 thus uses the bits generated by each RO bank 230 to generate a PUF key (e.g., a 64 bit, 128 bit, 256 bit, 512 bit key) that can be used during a booting operation. The PUF key can then be used as a key encryption key.

Entropy source 300 along with PUF entropy extraction logic is used to generate the key encryption key (e.g., the PUF key). Such a key is unique to this setup and can be used as a key encryption key. If the second component (e.g., primary die) already has a root of trust key encryption key defined, then the 3D key encryption key and root of trust key encryption key can input to an additive cipher (e.g., an XOR), and the output can be used as a heterogeneous integration circuitry-specific (e.g., device-specific) key for various use cases described herein, including a booting operation. If the heterogeneous integration circuitry is deconstructed, and the first component 110 is separated from the second component 120, PUF logic 330 will generate an incorrect key encryption key during the booting operation, and the booting operation will fail (e.g., fail to continue).

In one or more embodiments, a quantity of connectors 315 and connectors 320, one or both of which may include sets of TSVs, may be reduced relative to other techniques. For example, fewer than one hundred of connectors (e.g., TSVs) between connectors 315 and connectors 320 may be needed to implement the techniques described herein for one advantage of fewer connectors includes reducing information leakage and possibility of errors due to fault injection or attacks. Another advantage of fewer connectors includes decreased complexity, power consumption, and manufacturing costs.

In one or more embodiments, an entropy source other than ROs (and RO banks) may be implemented. In one embodiment, a static random access memory (SRAM)-based PUF is the entropy source. In another embodiment, a delay-based PUF is the entropy source. In some cases, an RO-based PUF may be more stable across temperature, voltage, and aging variations than other techniques, including SRAM-based and delay-based techniques.

In one or more embodiments, one or more, or all, of RO banks 230 are split across the first component 110 and the second component 120. For example, half of the ROs of RO bank 230-*d* may be located on first component 110, and half of the ROs of RO bank 230-*d* may be located on second component 120, where additional connectors are provided between the first component 110 and the second component 120 to run signals between the ROs of the RO bank 230-*d*. However, splitting an RO bank 230 between first component 110 and second component 120 may result in a relatively less stable entropy source across voltage, temperature, and aging variations, as well as increasing the cost of production (e.g., an increased number of connectors 315 and/or connectors 320 may be needed) and much more expensive. In one example, thousands for TSVs would be needed where RO banks 230 are split relative to an approach where each RO bank is confined to a single component.

Figure 4:
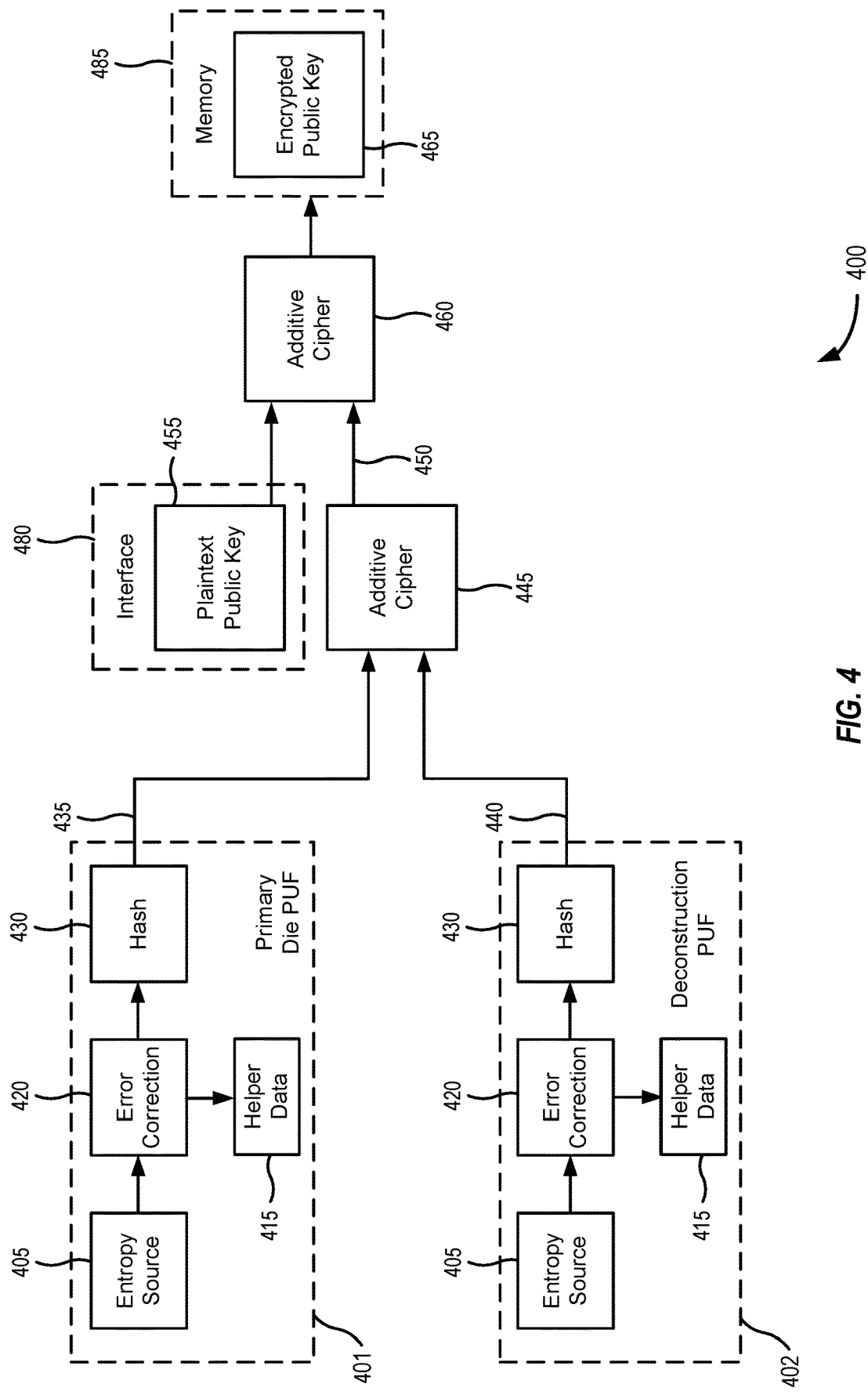
FIG. 4 illustrates a flow to generate an encrypted public key according to some examples.

FIG. 4 illustrates a flow 400 to generate an encrypted public key. In one or more examples, the flow 400 is performed during an enrollment operation of a device have multiple components, such as a heterogeneous integration circuitry device. A PUF 401 (which may also be referred to as a primary die PUF) is located on a second component, such as a primary die of a heterogeneous integration circuitry. A PUF 402 (which may also be referred to as a deconstruction PUF) is located on a first component, such as a top die of a heterogeneous integration circuitry.

PUF 402 includes an entropy source 405 (e.g., based on a set of one or more RO banks, SRAM, or delay circuit) that outputs a first set of bits. During an enrollment operation, the error correction circuit 420 may generate helper data 415 (which may also be referred to as assistance information). The first set of bits is then subject to a hash operation 430 to generate a first key 440 output from the PUF 402 (e.g., the deconstruction PUF).

Similarly, PUF 401 includes an entropy source 405 (e.g., based on a set of one or more RO banks, SRAM, or delay circuit) that outputs a second set of bits. During an enrollment operation, the error correction circuit 420 may generate helper data 415 (which may also be referred to as assistance information). The second set of bits is then subject to a hash operation 430 to generate a second key 435 output from the PUF 401 (e.g., the primary die PUF).

The first key 440 and the second key 435 can then be input to a key generation circuit, such as an additive cipher 445 (e.g., an exclusive-OR function (XOR) circuit) to generate a key encrypted key 450.

A customer may provide a plaintext public key 455 to the heterogeneous integration circuitry via a public key interface 480. An additive cipher 460 (e.g., an XOR circuit) then takes as an input the key encrypted key 450 and the plaintext public key 455 to generate an encrypted public key 465 based on the plaintext public key 455. The generated encrypted public key 465 may be stored in a memory device, for example on the second component (e.g., the primary die).

Figure 5:
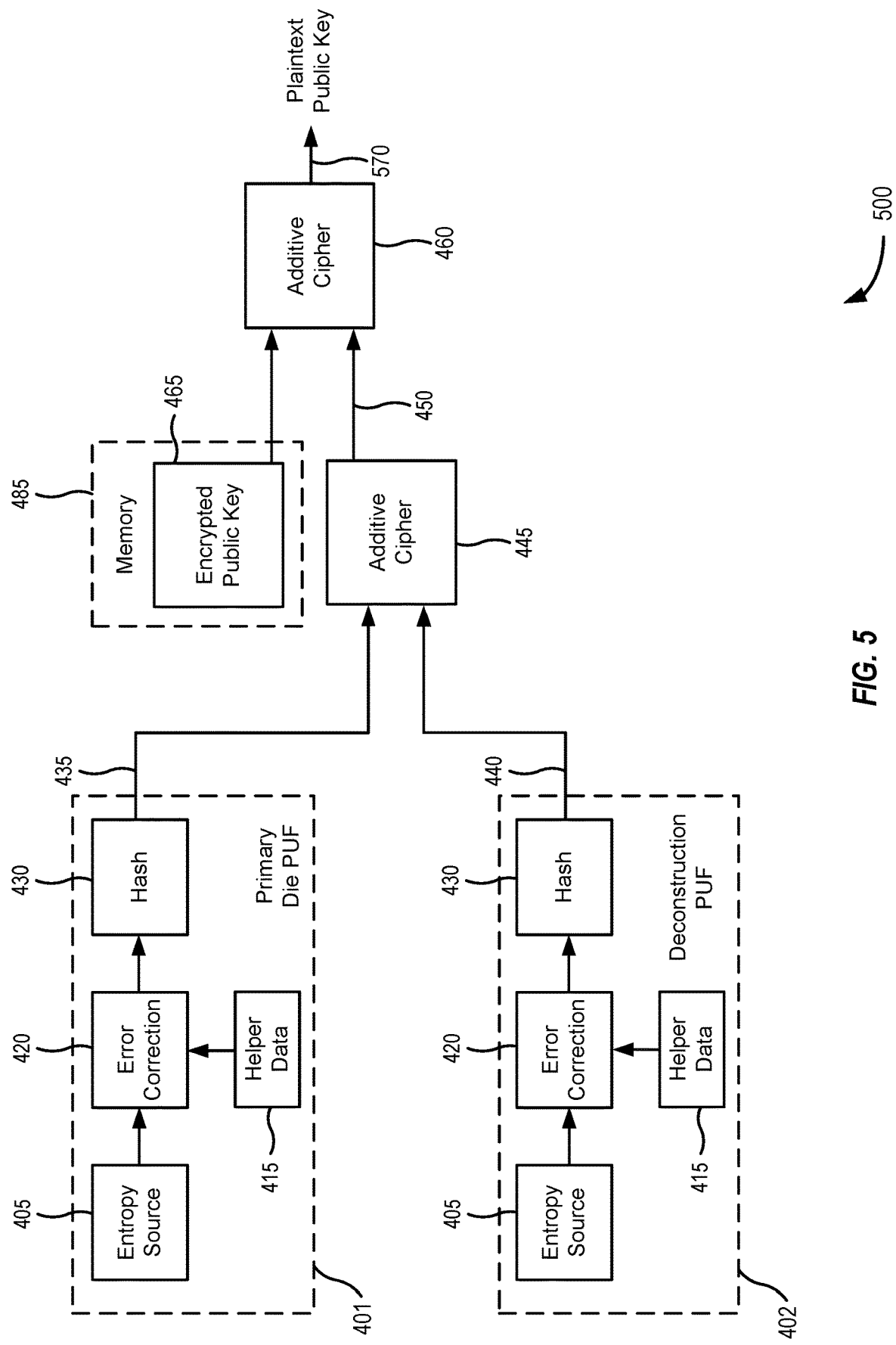
FIG. 5 illustrates a flow to generate a plaintext public key according to some examples.

FIG. 5 illustrates a flow 500 to generate a plaintext public key. In one or more examples, the flow 500 is performed in connection with a booting operation of a device have multiple components, such as a heterogeneous integration circuitry device. A PUF 401 (which may also be referred to as a primary die PUF) is located on a second component, such as a primary die of a heterogeneous integration circuitry. A PUF 402 (which may also be referred to as a deconstruction PUF) is located on a first component, such as a top die of a heterogeneous integration circuitry.

PUF 402 includes an entropy source 405 (e.g., based on a set of one or more RO banks, SRAM, or delay circuit) that outputs a first set of bits. During a booting operation (e.g., where obtaining the plaintext public key is desired), an error correction circuit 420 can use helper data 415 (which may also be referred to as assistance information) that is obtained by the heterogeneous integration circuitry during the enrollment operation. The corrected first set of bits is then subject to a hash operation 430 to generate a first key 440 output from the PUF 402 (e.g., the deconstruction PUF).

Similarly, PUF 401 includes an entropy source 405 (e.g., based on a set of one or more RO banks, SRAM, or delay circuit) that outputs a second set of bits. During a booting operation (e.g., where obtaining the plaintext public key is desired), an error correction circuit 420 can use helper data 415 (which may also be referred to as assistance information) that is obtained by the heterogeneous integration circuitry during the enrollment operation. The corrected second set of bits is then subject to a hash operation 430 to generate a second key 435 output from the PUF 402 (e.g., the deconstruction PUF).

The first key 440 and the second key 435 can then be input to a key generation circuit, such as an additive cipher 445 (e.g., an exclusive-OR function (XOR) circuit) to generate a key encrypted key 450.

The encrypted public key 465 is read from or otherwise obtained from memory 485. An additive cipher 460 (e.g., an XOR circuit) then takes as an input the key encrypted key 450 and the encrypted public key 465 to generate the plaintext public key 570. The plaintext public key is then used by a boot loader during a secure booting operation for the heterogeneous integration circuitry.

If one or more components are deconstructed for the heterogeneous integration circuitry, for example the first component (e.g., a top die), including PUF 402, is removed from the heterogeneous integration circuitry, the first key 440 is not properly generated, such that the plaintext public key 570 will be different from the plaintext public key 455 provided by the customer during the enrollment operation (see flow 400), and the booting operation for the heterogeneous integration circuitry will fail.

Figure 6:
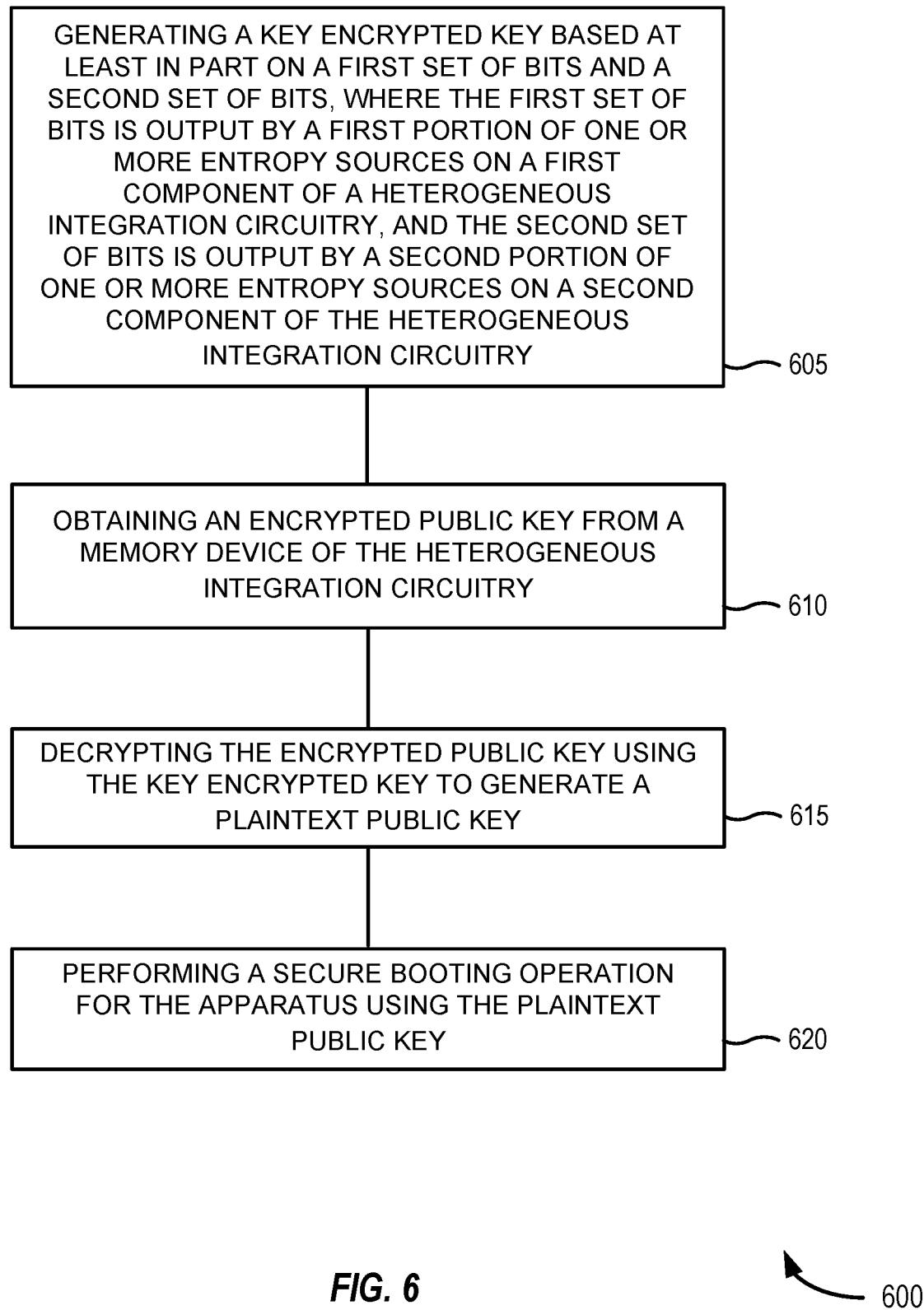
FIG. 6 is flow diagram of a method for securely booting a heterogeneous integration circuitry according to some examples.

FIG. 6 is flow diagram of a method 600 for securely booting a heterogeneous integration circuitry according to some examples. Various operations of the method 600 can be performed sequentially or in parallel.

At block 605, a key encrypted key is generated based at least in part on a first set of bits and a second set of bits. The key encrypted key may be generated by a key generation circuit. In one or more examples, the key generation circuit is an example of key generation circuit 245 or additive cipher 445. In one or more embodiments, the first set of bits is output by a first portion of one or more entropy sources on a first component of the heterogeneous integration circuitry, and the second set of bits is output by a second portion of one or more entropy sources on a second component of the heterogeneous integration circuitry. In one or more examples, the first portion of the one or more entropy sources is all or a portion of, or includes, RO banks 230 of first component 110 (e.g., RO banks 230-a, 230-d, 230-e, 230-f, 230-g), entropy source 405 of PUF 401, or PUF 401. In one or more examples, the second portion of the one or more entropy sources is all or a portion of, or includes, RO banks 230 of second component 120 (e.g., RO banks 230-c, 230-h, 230-i, 230-j, 230-k), entropy source 405 of PUF 402, or PUF 401.

At block 610, an encrypted public key is obtained from a memory device of the heterogeneous integration circuitry. In one or more examples, the memory device is memory 485 and the encrypted public key is encrypted public key 465.

At block 615, the encrypted public key is decrypted using the key encrypted key to generate a plaintext public key. The encrypted public key may be decrypted using a key security circuit. In one or more examples, the key security circuit is an example of additive cipher 460.

At block 620, a secure booting operation is performed for the apparatus using the plaintext public key. In one or more examples, the plaintext public key is plaintext public key 570.

Figure 7:
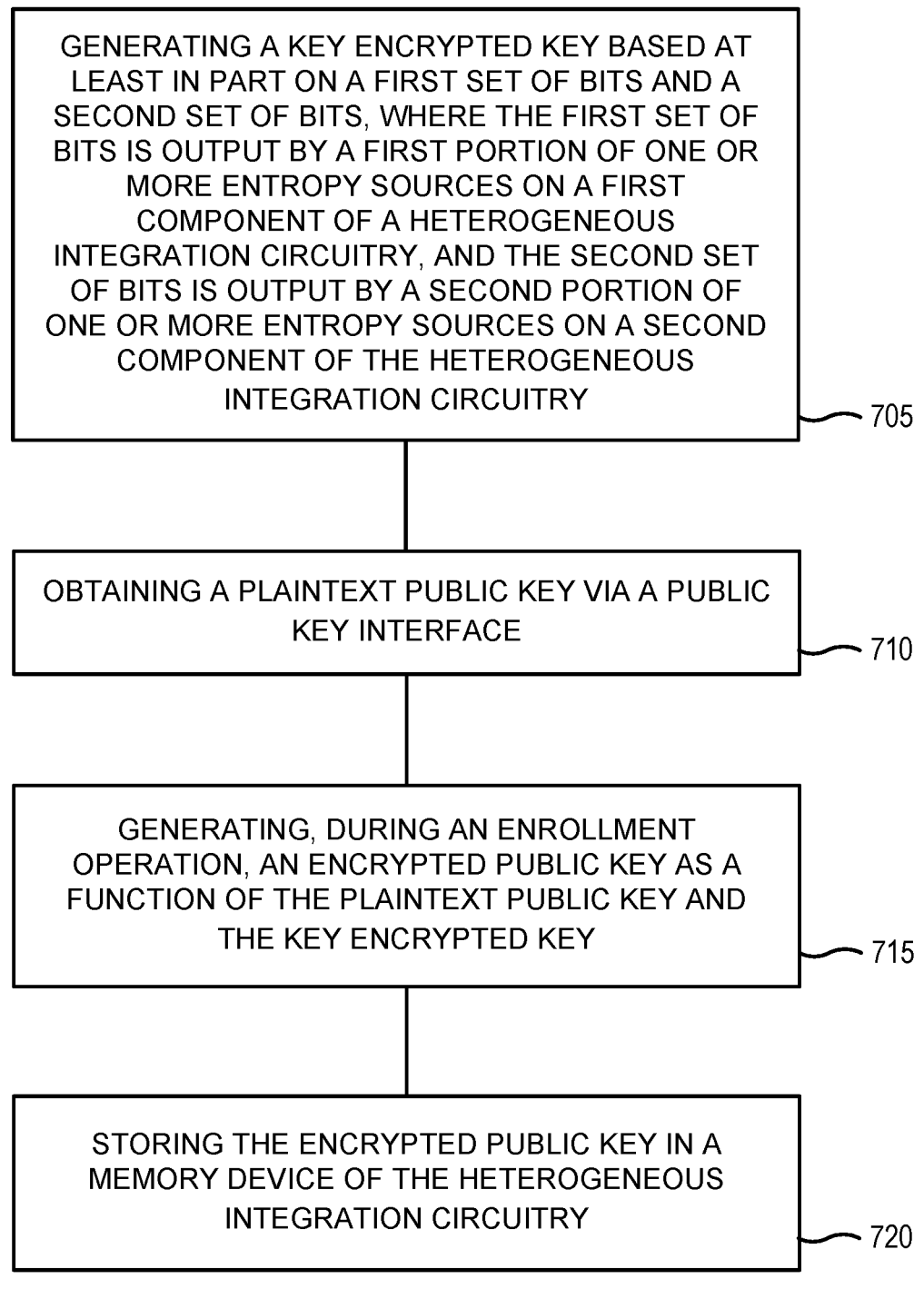
FIG. 7 is flow diagram of a method for securely booting a heterogeneous integration circuitry according to some examples.

FIG. 7 is flow diagram of a method 700 for securely booting a heterogeneous integration circuitry according to some examples. Various operations of the method 600 can be performed sequentially or in parallel.

At block 705, a key encrypted key is generated based at least in part on a first set of bits and a second set of bits. The key encrypted key may be generated by a key generation circuit. In one or more examples, the key generation circuit is an example of key generation circuit 245 or additive cipher 445. In one or more embodiments, the first set of bits is output by a first portion of one or more entropy sources on a first component of the heterogeneous integration circuitry, and the second set of bits is output by a second portion of one or more entropy sources on a second component of the heterogeneous integration circuitry. In one or more examples, the first portion of the one or more entropy sources is all or a portion of, or includes, RO banks 230 of first component 110 (e.g., RO banks 230-a, 230-d, 230-e, 230-f, 230-g), entropy source 405 of PUF 401, or PUF 401. In one or more examples, the second portion of the one or more entropy sources is all or a portion of, or includes, RO banks 230 of second component 120 (e.g., RO banks 230-c, 230-h, 230-i, 230-j, 230-k), entropy source 405 of PUF 402, or PUF 401.

At block 710, a plaintext public key is obtained via a public key interface. In one or more examples, the public key interface is public key interface 480. In one or more examples, the plaintext public key is plaintext public key 455.

At block 715, during an enrollment operation, an encrypted public key is generated as a function of the plaintext public key and the key encrypted key. The encrypted public key may be generated using a key security circuit. In one or more examples, the key security circuit is an example of additive cipher 460.

At block 720, the encrypted public key is stored in a memory device of the heterogeneous integration circuitry. In one or more examples, the memory device is memory 485 and the encrypted public key is encrypted public key 465.

While the foregoing is directed to specific examples, other and further examples may be devised without departing from the basic scope thereof, and the scope thereof is determined by the claims that follow.

What is claimed is:

1. An apparatus, comprising:
a first portion of one or more entropy sources on a first component of a heterogeneous integration circuitry;
a second portion of the one or more entropy sources on a second component of the heterogeneous integration circuitry;
a key generation circuit communicatively coupled with the first portion of the one or more entropy sources on the first component and the second portion of the one or more entropy sources on the second component to generate a key encrypted key based at least in part on a first set of bits output by the first portion of the one or more entropy sources and a second set of bits output by the second portion of the one or more entropy sources; and a key security circuit to generate, based at least in part on the key encrypted key and an encrypted public key stored at the apparatus, a plaintext public key to be used by a boot loader during a secure booting operation for the apparatus.

2. The apparatus of claim 1, wherein:

the one or more entropy sources comprise a first entropy source that is divided between the first component and the second component, the first portion of the first entropy source is on the first component and communicatively coupled with the second portion of the first entropy source on the second component.

3. The apparatus of claim 1, wherein:

the one or more entropy sources comprise at least a first entropy source on the first component and a second entropy source on the second component;

the first portion of the one or more entropy sources comprises the first entropy source; and the second portion of the one or more entropy sources comprises the second entropy source.

4. The apparatus of claim 1, further comprising:

a public key interface to receive the plaintext public key; and a memory device to store the encrypted public key, wherein the key security circuit is communicatively coupled with the memory device to generate the encrypted public key as a function of the plaintext public key and the key encrypted key during an enrollment operation.

5. The apparatus of claim 1, wherein:

the one or more entropy sources comprise a plurality of ring oscillators;

the first portion of the plurality of ring oscillators comprises a first set of ring oscillator banks, each ring oscillator bank of the first set of ring oscillator banks comprising a plurality of ring oscillators to output a set of bit values corresponding to the ring oscillator bank; and the second portion of the plurality of ring oscillators comprises a second set of ring oscillator banks, each ring oscillator bank of the second set of ring oscillator banks comprising a plurality of ring oscillators to output a set of bit values corresponding to the ring oscillator bank.

6. The apparatus of claim 1, further comprising:

a selection circuit to select the first portion and the second portion from the one or more entropy sources for the key generation circuit to use to generate the key encrypted key.

7. The apparatus of claim 6, further comprising:

a third portion of the one or more entropy sources on a third component of the heterogeneous integration circuitry, the third portion of the one or more entropy sources communicatively coupled with the key generation circuit, wherein:

the first component is a top component of the heterogeneous integration circuitry;

the second component is a base component of the heterogeneous integration circuitry;

the third component is a middle component of one or more middle components of the heterogeneous integration circuitry; and the selection circuit determines not to select the third portion based at least in part on the third component being the middle component of the heterogeneous integration circuitry.

8. The apparatus of claim 6, further comprising:

a third portion of the one or more entropy sources on a third component of the heterogeneous integration circuitry, the third portion of the one or more entropy sources communicatively coupled with the key generation circuit; and a wiring substrate of the heterogeneous integration circuitry, wherein the first component is attached to the wiring substrate, the second component is attached to the wiring substrate, the third component is attached to the wiring substrate, and the first component, second component, and third component are communicatively coupled via the wiring substrate, and wherein the selection circuit determines to select the first portion, the second portion, and the third portion based at least in part on the first component, the second component, and the third component behind attached to the wiring substrate.

9. The apparatus of claim 1, further comprising:

a first component key generation circuit communicatively coupled with the first portion of the one or more entropy sources to generate a first key based at least in part on the first set of bits; and a second component key generation circuit communicatively coupled with the second portion of the one or more entropy sources to generate a second key based at least in part on the second set of bits, wherein the key generation circuit generates the key encrypted key as a function of the first key and the second key.

10. The apparatus of claim 9, wherein:

the first component key generation circuit performs a first hash operation on the first set of bits to generate the first key; and the second component key generation circuit performs a second hash operation on the second set of bits to generate the second key.

11. The apparatus of claim 1, wherein the heterogeneous integration circuitry comprises the first component attached to the second component using a plurality of thru-silicon vias.

12. The apparatus of claim 1, wherein the heterogeneous integration circuitry comprises the first component attached to a wiring substrate and the second component attached to the wiring substrate, the first component communicatively coupled with the second component through the wiring substrate.

13. A method of securely booting a heterogeneous integration circuitry apparatus, comprising:

generating a key encrypted key based at least in part on a first set of bits and a second set of bits, where the first set of bits is output by a first portion of one or more entropy sources on a first component of a heterogeneous integration circuitry, and the second set of bits is output by a second portion of the one or more entropy sources on a second component of the heterogeneous integration circuitry;

obtaining an encrypted public key from a memory device of the heterogeneous integration circuitry;

decrypting the encrypted public key using the key encrypted key to generate a plaintext public key; and performing a secure booting operation for the apparatus using the plaintext public key.

14. The method of claim 13, further comprising:
obtaining the plaintext public key via a public key interface;
generating, during an enrollment operation, the encrypted public key as a function of the plaintext public key and the key encrypted key; and
storing the encrypted public key in a memory device of the heterogeneous integration circuitry.

15. The method of claim 13, further comprising:
selecting the first portion from the one or more entropy sources to use to generate the key encrypted key based at least in part on the first component being a top component of the heterogeneous integration circuitry; and
selecting the second portion from the one or more entropy sources to use to generate the key encrypted key based at least in part on the second component being a base component of the heterogeneous integration circuitry.

16. The method of claim 15, wherein the heterogeneous integration circuitry further comprises a third portion of the one or more entropy sources on a third component, the method further comprising:
determining not to select the third portion from the one or more entropy sources to use to generate the key encrypted key based at least in part on the third component being a middle component of one or more middle components of the heterogeneous integration circuitry.

17. The method of claim 13, further comprising:
selecting the first portion and the second portion to use to generate the key encrypted key based at least in part on the first component being attached to a wiring substrate and the second component being attached to the wiring substrate, wherein the first component and the second component are communicatively coupled via the wiring substrate.

18. The method of claim 13, wherein the one or more entropy sources comprise a plurality of ring oscillators, the method further comprising:
obtaining the first set of bits from a first set of ring oscillator banks on the first component, each ring oscillator bank of the first set of ring oscillator banks comprising a plurality of ring oscillators to output a set of bit values corresponding to the ring oscillator bank; and
obtaining the second set of bits from a second set of ring oscillator banks on the second component, each ring oscillator bank of the second set of ring oscillator banks comprising a plurality of ring oscillators to output a set of bit values corresponding to the ring oscillator bank.

19. A method of securely booting a heterogeneous integration circuitry apparatus, comprising:
generating a key encrypted key based at least in part on a first set of bits and a second set of bits, where the first set of bits is output by a first portion of one or more entropy sources on a first component of a heterogeneous integration circuitry, and the second set of bits is output by a second portion of the one or more entropy sources on a second component of the heterogeneous integration circuitry;
obtaining a plaintext public key via a public key interface;
generating, during an enrollment operation, an encrypted public key as a function of the plaintext public key and the key encrypted key; and
storing the encrypted public key in a memory device of the heterogeneous integration circuitry.

20. The method of claim 19, further comprising:
obtaining the encrypted public key from the memory device of the heterogeneous integration circuitry;
decrypting the encrypted public key using the key encrypted key to generate the plaintext public key; and
performing a secure booting operation for the apparatus using the plaintext public key.

* * * * *